US006579410B1

(12) United States Patent
Bleakley et al.

(10) Patent No.: US 6,579,410 B1
(45) Date of Patent: Jun. 17, 2003

(54) PIGMENT MATERIALS AND THEIR PREPARATION AND USE

(75) Inventors: Ian Stuart Bleakley, St Austell (GB); Jonathan Stuart Phipps, St Ewe (GB); Paul A Rey, Moon Township, PA (US); Jose M Rodriguez, Eatonton, GA (US); Hannu Olavi Ensio Toivonen, Roswell, GA (US)

(73) Assignee: Imerys Minerals Limited, Cornwall (GB)

( * ) Notice: Subject to any disclaimer, the term of this patent is extended or adjusted under 35 U.S.C. 154(b) by 0 days.

(21) Appl. No.: 08/957,280

(22) Filed: Oct. 24, 1997

Related U.S. Application Data

(60) Provisional application No. 60/052,456, filed on Jul. 14, 1997.

(51) Int. Cl.[7] ............................. D21C 9/00; D21H 17/64; D21H 17/66; D21H 17/70
(52) U.S. Cl. ........................ 162/9; 162/10; 162/181.2; 162/181.7; 162/181.4; 106/461; 106/463
(58) Field of Search ........................... 162/181.1, 181.2, 162/181.3, 181.4, 181.5, 181.6, 181.7, 181.8, 181.9, 183, 184, 9, 10, 146, 158; 106/461, 463, 468; 428/486, 488.1, 204, 195

(56) References Cited

U.S. PATENT DOCUMENTS

| 2,108,761 A | * | 2/1938 | Becher ........................ 162/145 |
| 2,599,094 A | * | 6/1952 | Graig ........................... 162/146 |
| 2,935,437 A | * | 5/1960 | Taylor ....................... 162/181.6 |
| 2,952,580 A | * | 9/1960 | Frasch ........................ 162/158 |
| 3,227,607 A | * | 1/1966 | Mays et al. ............... 162/181.6 |
| 3,445,259 A | * | 5/1969 | Brooks ....................... 106/462 |
| 5,275,699 A | * | 1/1994 | Allan et al. ............... 162/181.2 |
| RE35,460 E | * | 2/1997 | Klungness et al. ............ 162/9 |
| 5,679,220 A | * | 10/1997 | Matthew et al. ......... 162/181.4 |

FOREIGN PATENT DOCUMENTS

| EP | 0 604 095 A1 | 6/1994 |
| EP | 0 658 606 A1 | 6/1995 |
| EP | 0 737 774 A1 | 10/1996 |
| EP | 0 768 344 A2 | 4/1997 |
| GB | 2 306 461 A | 5/1997 |
| JP | 62-162098 | * 7/1987 |
| JP | 62-199898 | * 9/1987 |
| WO | WO/9632354 | 10/1999 |

* cited by examiner

*Primary Examiner*—Jose A. Fortuna
(74) *Attorney, Agent, or Firm*—Finnegan, Henderson, Farabow, Garrett & Dunner, L.L.P.

(57) ABSTRACT

A new composite material which is useful as a pigment in paper making or paper coating is produced by precipitating a white insoluble pigment compound, eg calcium carbonate, in an aqueous suspension containing a mixture of fine particulate material eg titanium dioxide particles and fibers, eg cellulosic fibers. These suspended solids in the mixture are derived from separate stocks and added together to produce the composite pigment material. The new material is a bonded matrix of the fibers and the white pigment compound having particles of the fine particulate material, eg $TiO_2$, dispersed and bonded within the matrix. The new material may exist in the form of particles in dry or wet form which may be further treated in a known way prior to use in paper making or paper coating. Use of the new material allows expensive fine particulate material such as $TiO_2$ particles to be better retained in a paper making composition whilst at the same time avoiding the known problem of agglomeration or 'crowding' of the fine particles which is known to affect adversely the optical properties of the composition produced using the fine particles.

16 Claims, 7 Drawing Sheets

PIGMENT MATERIALS AND THEIR PREPARATION AND USE

This application claims the benefit of U.S. Provisional Application No: 60/052,456, filed Jul. 14, 1997.

BACKGROUND OF THE INVENTION

The present invention relates to pigment materials and their preparation and use. In particular, it relates to new pigment material comprising a composite containing a fine particulate material such as titanium dioxide and to the preparation of such material and its use in operations to make or coat paper and the like sheet materials.

Titanium dioxide, herein "$TiO_2$", is an example of a fine particulate material which, unlike materials which are employed as bulk fillers, is employed for a specific function in paper making and paper coating operations. It offers excellent pigment opacity and brightness (which together result in excellent light scattering) and is therefore used to extend these properties in a paper making or coating composition. $TiO_2$ is a very expensive material and is consequently used only sparingly in paper making or coating compositions, eg. usually forming less than 5% by weight of the solids present in the composition. Because of its cost, $TiO_2$ needs to be employed as efficiently as possible.

The optimum particle size for $TiO_2$ pigment particles to give the best light scattering properties has been determined in the prior art to be about 0.2 μm to 0.3 μm. $TiO_2$ pigment material is normally supplied commercially in a form wherein the particles have this optimum size. The $TiO_2$ product may be supplied dry, in which case it requires dispersion in liquid media, eg. aqueous media, to wet and to deagglomerate or disperse the particles. Alternatively, $TiO_2$ may be supplied commercially in a pre-dispersed slurry form which may incorporate a relatively large amount of anionic stabilizer.

Since the $TiO_2$ particles employed in paper making are very fine and are usually dispersed with relatively high levels of dispersant to make slurries containing the material pumpable and to maximize the spacing between particles to give optimal light scatter, it is difficult to retain such particles when they are employed in a furnish or like composition in a paper or like sheet forming operation.

In order to improve $TiO_2$ retention in such operations, in order to minimize $TiO_2$ losses, various chemical retention aids are employed in the prior art. In general, such aids are expensive chemicals, eg. water soluble polymers, and the extent of use of such chemicals employed for the conventional retention of $TiO_2$ is considered to be very costly. Where the $TiO_2$ is supplied with anionic stabilizer large amounts of cationic chemicals (which may also serve as or be delivered together with retention aids) may be required to reduce the anionic loading.

$TiO_2$ particles (when used in a pigment-containing composition) have a tendency to agglomerate especially at higher loading levels, this effect being known as 'crowding'. Use of retention aid chemicals can increase loading which has been demonstrated in the prior art to have an adverse effect on the light scattering efficiency of the particles. This can result in degradation of the expected optical properties of commercially available $TiO_2$ material when used as a particulate pigment material in paper.

Furthermore, such added chemicals when used in substantial quantities to improve $TiO_2$ retention can have an adverse effect on the formation of the paper or other sheet being produced and can result in sheets of less than ideal quality in which the constituents of the sheet are not uniformly distributed.

Attempts have been reported in the prior art to counteract the effects of crowding of fine particulate material, especially $TiO_2$, by forming composites of the particles of the material with various organic or inorganic materials to space the particles from one another. These attempts have been aimed primarily at improving the optical properties of the compositions to which the composite material is added.

The problem of maintaining a reasonable retention of $TiO_2$ particles in a paper making operation, whilst at the same time avoiding crowding and an adverse effect on sheet formation and quality caused by the addition of chemicals to facilitate retention, has not satisfactorily been solved in the prior art. One purpose of the present invention is to provide a novel solution to this problem.

Similar problems arise with the retention of other fine particulate materials, and it is another purpose of the present invention to provide a novel solution to the retention of such materials.

It is a further purpose of this invention to produce a novel pigment material which is useful in paper coating.

SUMMARY OF THE INVENTION

The present invention is concerned with the preparation and use of novel composites, not disclosed or suggested in the prior art, which can, amongst other things, improve the retention of fine particulate material such as $TiO_2$ in paper making compositions without seriously affecting optical or other properties, in some cases beneficially improving such properties also. The novel composites can also be used beneficially in paper coating.

According to the present invention in a first aspect there is provided a method of preparing and using a composite pigment material which incorporates a fine particulate material, which method comprises (a) treating an aqueous medium containing dispersed particles of a fine particulate material and also fibers by chemically precipitating by a precipitation reaction in the aqueous medium crystals of a white insoluble pigment compound thereby forming a composite pigment material comprising a composite matrix of fiber and precipitated crystals of the white pigment compound and particles of the fine particulate material dispersed and bonded within the matrix; and (b) adding the composite material to a composition for forming or coating a fibrous sheet material. The method may thereafter include (c) forming or coating a fibrous sheet material using the composition incorporating the composite material. The said aqueous medium employed in step (a) may comprise an aqueous suspension or slurry.

The fine particulate material and the fibers may be obtained from separate stocks and may be added together prior to step (a) to produce the composite pigment material. Either or both of these materials may be in dry or wet (eg. slurry) form when they are added together.

At least part of the fine particulate material may comprise fresh particles. By 'fresh' particles of fine particulate material is meant particles which have not previously been used in a sheet forming or coating or other operation.

The fibrous sheet material formed or coated in step (c) may comprise paper, paper board, card, cardboard, laminated paper and the like herein collectively called 'paper', wherein the fibrous sheet material comprises organic, eg. cellulosic fibers, and in many cases also inorganic filler comprising a particulate pigment material.

By "fine particulate material" is meant a particulate material wherein the particles have a size distribution such that at least 90% by weight have an esd (equivalent spherical diameter as measured in a known way by sedimentation) of less than 1 µm. At least 50 per cent by weight may have an esd less than 0.5 µm. The fine particulate material will generally be one which is more expensive than bulk filler materials (eg. kaolin and/or calcium carbonate) and one which is used in paper for a specific function (other than bulk filling) and generally has a poor natural retention in paper making.

The present invention is especially beneficial where the fine particulate material comprises $TiO_2$, although the particulate material may alternatively, or in addition, be selected from calcined kaolin-containing material, eg. metakaolin, fine silica, eg. so called fumed silica, sodium silicate, aluminum silicate, sodium aluminum silicate, talc and so called plastic pigment materials, eg. produced from melamine formaldehyde. It should be noted that calcined material may contain aggregates of fine particles fused or sintered together but the fine particles which make up such aggregates may have the required particle size distribution properties if measured individually.

The said white insoluble pigment compound which is precipitated in the method according to the first aspect of the present invention may comprise a water insoluble salt, ie. it may be formed from or regarded as formed from an acid and a base. It may conveniently comprise an alkaline earth metal carbonate, eg. calcium carbonate, the precipitation of which is relatively easy and well known, although the said compound could alternatively or in addition comprise one or more other precipitate compounds, eg. selected from phosphates or silicates of calcium, aluminium or magnesium, which may be produced in a known manner, eg. as described in GB2306461A. Reactants to produce the white insoluble pigment compound (eg. providing acidic and basic species) may be added together or separately to the aqueous medium.

DESCRIPTION OF THE INVENTION

In the method according to the first aspect of the present invention the fibers present in the aqueous suspension together with particles of the fine particulate material when the precipitation reaction is carried out in the suspension may comprise organic fibers from natural sources. They may comprise cellulosic fibers derived from wood pulp, although they could also include fibers derived from sources such as straw, bamboo, hemp, bagasse, sisal, flax, cotton, jute and ramie. Desirably, at least a portion, eg. preferably at least 50% by weight, are fresh cellulosic fibers which have not previously been employed in paper making. Fibers obtained from a wood pulp source may have been treated eg. by mechanical and/or chemical processing to separate lignins, resins and the like, by bleaching and the like and other processes to refine such fibers all in a known way depending on the pulp source.

The fibers, or at least a portion of them, present in the treated aqueous suspension in step (a) of the method according to the first aspect of the present invention, may be derived from broke which comprises paper or like sheet material which has been rejected as a product following a sheet forming and/or coating operation. An uncoated paper making operation may generate a quantity of broke which is typically 5% to 15% by weight of the product output. A coated paper operation may generate a higher quantity of broke, eg. up to 30% by weight of the product output, owing to the extra operations required to produce the coated paper.

The broke may arise from trimmings, reel ends, reject reels, reject sheeting, sheet breaks and the like. Broke is normally collected and resuspended in an aqueous medium. It may be repulped in broke pulpers. Pulp obtained from broke is usually stored separately from virgin pulp. It tends to have a quality which is inferior to virgin pulp, because it usually contains minerals and has been dried and repulped—although the quality may be improved by a separation step as described hereinafter. Another source of fiber pulp is recycled paper, ie. paper previously sold and used as a paper product.

Preferably at least 50% by weight, desirably at least 70% by weight of the fibers employed in the treated aqueous suspension in step (a) of the method according to the first aspect are derived from virgin pulp. Up to 50%, but in many cases not more than 30%, by weight of the fibers may be derived from broke pulp or from pulp obtained from recycled paper.

We prefer that the fibers employed in step (a) of the method according to the first aspect of the present invention comprise a multiplicity of fibrils or microfibrils which may be attached to and/or separated from parent fiber stems. We prefer to treat pulp from which the fibers are to be obtained, whether virgin or broke pulp or from recycled paper, by refining or beating in a known way, eg. in one of the known beaters or refiners employed in the pulp refining industry. As is well known to those skilled in the art, the degree of refining or fibrillation of pulp fibers may be measured in a known way and expressed in Canadian Standard Freeness (CSF) units (the lower the CSF value the higher the degree of refining).

Preferably the fibers used in step (a) are refined or beaten to a freeness value of 300 CSF or less, desirably to 200 CSF or less. We have found from microscopic examination, eg. using a scanning electron microscope, that fibrils and especially microfibrils produced by refining can provide excellent nucleation sites for the crystals of the white pigment compound which are to be precipitated.

At least a portion of the fibers employed in step (a) of the method according to the first aspect may themselves comprise fibers or fibrils which are fines as defined in TAPPI Standard T261 cm-90, ie. which will pass through a round hole of diameter 76 µm. Where fines are present at least 1 per cent by weight, eg. at least 20 per cent by weight, in some cases as much as 50 per cent to 100 per cent by weight, of fibers present in the precipitation step are fibers or fibrils which are fines. Such fines may be produced, as is well known in the art, by extensive beating or fibrillation optionally together with a known size classification or separation procedure, eg. using a screen or mesh or filter. Such fines may include a substantial proportion of microfibrils which are sub-micron size, eg. having sizes in the range 0.1 µm to 0.99 µm.

Separation of fibers into size classes may be carried out using devices well known in the art, eg. using a screen having a variety of slot sizes operating optionally with pressurization. For example, a "DSM" (Dutch State Mines) curved pressure screen device having the trade name SIEVEBEND produced by Dorr Oliver or a Spray Filter device made by Krofta may be used to separate a fines fraction of fibers or fibrils.

The fibers which are treated to provide fibrillation and/or size classification may be produced from virgin pulp or from broke or recycled paper. The large fiber fraction obtained after separation of the fines fraction may be used as paper making fibers. Composite material produced in the manner of the present invention may be added to such separated large fibers in a subsequent paper making operation as described hereinafter.

Where fibers or fibrils are present between fine particulate material such as $TiO_2$ particles in the treated aqueous suspension when crystals of a white pigment compound are precipitated therein, the white pigment compound is precipitated inside and at the surface of the fibers (including any fibrils and microfibrils attached to the fiber stem) and the particles of the fine particulate material thereby become bonded or cemented to the fibers by the crystals of the white pigment.

The particles of the fine particulate material, if suitably dispersed when the precipitation reaction is carried out, unexpectedly and beneficially remain dispersed in the solid composite matrix formed when the bonding crystals of the white pigment compound are precipitated and become cemented to the fibers present.

Where the precipitate compound formed is a basic compound, eg. calcium carbonate, it can advantageously be effective in neutralising any anionic charges present in a paper making or coating composition, eg. due to the addition of anionic stabilizers, thereby allowing the amount of any added cationic chemicals to be reduced.

By forming a composite material comprising particles of fine particulate material such as $TiO_2$ dispersed in a solid matrix of crystals of white pigment compound and also incorporating fibers, a new pigment structure is provided which can show various unexpected benefits when used in paper making or paper coating operations as described hereinafter.

According to the present invention in a second aspect there is provided a composite pigment material comprising a composite matrix of fibers and precipitated crystals of white pigment compound and particles of fine particulate material as defined hereinbefore, dispersed and bonded within the matrix which composite material is the product of step (a) of the method according to the first aspect.

Particles of the composite pigment material according to the second aspect may be employed in a known manner as a pigment filler ingredient in paper making or as a pigment ingredient in paper coating. Such particles may be the sole filler or pigment source or they may optionally be blended with conventional or known fillers or pigment particles employed in such applications, eg. selected from one or more of kaolin, calcined kaolin, calcium carbonate (derived from a natural or synthetic source or composited in a known manner with other materials derived from waste streams), dolomite, talc, mica or untreated $TiO_2$ or other fine particulate material (eg. as used in the preparation of the composite pigment material).

The composite pigment material according to the second aspect may form from 1% to 100% by weight of the filler or pigment particles employed in such applications, eg. in the making of a furnish employed in paper making or a coating composition employed in paper coating, or in specialist sheet coating operations, eg. decorative laminate formation, although it may be blended with other, eg. conventional filler or pigment, materials eg. wherein it may form up to 50% by weight, in some cases up to 80% by weight of the blend. The filler(s) or pigment(s) employed in such applications will depend upon the use of the filler or pigment. Fillers in paper making may form up to 40 per cent by weight (on a dry solids weight basis) of the paper making composition or furnish. The pigment(s) employed in coating compositions usually forms up to 80% by weight in some cases as high as about 95% (on a dry solids basis) by weight of the composition.

The composite pigment material according to the second aspect of the present invention can allow fine particulate materials such as $TiO_2$ to be much more efficiently retained in a paper making operation. For example, in contrast to the low retention levels obtained in the prior art for untreated $TiO_2$ (without application of a retention aid) or for $TiO_2$ treated with only a small amount of retention aid (eg. retention levels of about 30% or less, even 20% or less, as illustrated hereinafter), the retention level of $TiO_2$ for a single pass in a paper sheet making operation by production and use of the composite material according to the second aspect of the present invention can advantageously be greater than 40% in many cases about 60% or more, eg. 70% or more as illustrated hereinafter (depending on the composition of the composite pigment material and the amount of the material loaded into the paper composition). This allows a reduction in the quantity and cost of retention aid chemical(s) employed to retain fine particulate material such as $TiO_2$, although some retention aid chemical(s) may optionally be added, (eg. in the usual manner to the dilute pulp furnish stock from which the paper sheets are to be produced).

Beneficially, reducing the amount of retention aid chemicals can also improve the burst strength (also known as burst index) of the sheet produced and the paper sheet formation, ie. the overall quality of the paper sheet produced by providing more uniform distribution of the constituents of the sheet.

In addition, the sheet so formed may beneficially have a stiffness or 'crackle' which is greater than that for a comparable sheet made from fine particulate material such as $TiO_2$ as in the prior art. This allows, for example, paper of the same stiffness as comparable prior art sheets to be produced lighter in weight and (for sheets of the same weight as prior art sheets) more cheaply.

Furthermore, because the fine particulate material is better retained in the paper making process, less fine particulate material is lost and it is not necessary to compensate for the usual loss which is expected to occur by addition of excessive quantities of the material, which, as in the case of $TiO_2$, can be very expensive.

A further benefit obtained by preparation and use of composite pigment material according to the second aspect of the present invention in a paper making or coating operation is that the undesirable crowding (normally obtained as in the prior art) of particles of the fine particulate material caused or exacerbated by use of added chemicals is reduced and this allows the adverse effect on scattering of light from the particles caused by such crowding to be reduced. Since the crystals of the precipitated pigment compound may themselves be fine and highly scattering their presence contributes beneficially to the optical properties of the composite pigment material and may allow further reduction of the amount of fine particulate material, where pigment material such as $TiO_2$, which may be employed as compared with prior art compositions aimed at giving similar properties.

Thus, generally the present invention allows savings in the amount and cost of fine particulate material employed in paper making and paper coating as well as in the use of associated expensive chemicals as well as providing improvements in various properties of the sheet product.

According to the present invention in a third aspect there is provided a paper or like sheet material incorporating filler or coating pigment particles which comprise particles of the composite pigment material according to the second aspect.

In the method according to the first aspect of the present invention the solids employed, other than consumable reagent(s) employed to form the precipitate compound, will depend on the kind of reactor employed which, in turn, will depend upon the process conditions required to be operated. These are discussed further below. Where step (a) of the method according to the first aspect is carried out in a conventional stirred batch reactor, eg. for precipitating calcium carbonate, the said solids may form from 0.1% to 20% by weight of the aqueous suspension to be treated to give precipitation formation therein. Desirably, such solids constitute from 1% to 10% by weight, especially 2% to 7% by weight, of the treated suspension in the use of such a reactor.

In other reactors, eg. to operate a continuous or semi-continuous process, eg. using a pressurized refiner as described below, the solids content may be higher, eg. up to levels of 40% or even 50%, eg. in the manner described by Klungness et al in US00RE35460E.

In the composite pigment material according to the second aspect of the present invention the weight ratio of the said fine particulate material to precipitated white pigment compound present may be in the range 1:100 to 1:1, especially 1:20 to 1:2. The weight ratio of precipitated white pigment compound present to fibers present may be in the range 10:1 to 1:10, especially 3:1 to 1:3. The fibers present in the composite pigment material may constitute at least 10% by weight especially 25% to 75% by weight of the material (on a dry solids basis). Likewise, the white pigment compound present in the composite pigment material may constitute at least 10% by weight, especially 25% to 75% by weight of the material (on a dry solids basis).

The composite pigment material according to the second aspect of the present invention may comprise particles whose size will depend upon the size of the constituents used to form the particles, especially the size of fibers contained therein. Where fibers present comprise fines, the composite pigment material particles may comprise fines. Where the fibers are larger, eg. greater than 100 μm in length the composite material particles may correspondingly be larger. In any event, if desired, it is possible to treat the composite material particles produced by comminution, eg. by wet stirring, milling or grinding, and optionally particle size classification as described hereinafter.

The individual precipitate crystals which make up the matrix of the composite pigment material will generally have a size comparable with such crystals formed in the prior art (when not part of a composite structure). Generally, such crystals will be sub-micron size, eg. having sizes in the range 0.1 μm to 1 μm.

Where the fine particulate material comprises $TiO_2$, the $TiO_2$ particles employed in the method according to the first aspect of the present invention may be of the rutile or anatase form. We prefer the rutile form. Commercially available $TiO_2$ pigment material may be employed. However, because the problem of retention of $TiO_2$ in paper making is considerably reduced by forming the composite pigment material according to the second aspect, it is possible although not essential in forming the composite material to use at least a portion of $TiO_2$ particles which are finer than those conventionally used, eg. having a size of about 0.1 μm or less.

In the method according to the first aspect of the present invention, the fresh particles of the fine particulate material may be employed in an aqueous suspension to be treated to form a precipitate therein may be added in dry form to a reactor vessel containing water or in predispersed slurry form to the reactor vessel. In either case it is preferred that the suspension containing the fine particulate material so formed is mechanically agitated, eg. by vigorous stirring, preferably both before and during the precipitation reaction, to ensure that the particles of the fine particulate material are maintained in a dispersed state in the suspension whilst the crystal precipitation proceeds. If desired, a known dispersing agent, eg. a polyelectrolyte such as one of the agents well known for the dispersion of particulate materials in an aqueous suspension, eg. sodium polyacrylate, may also be present preferably in a small amount, eg. less than 0.5 per cent by weight. The fibers required to form part of the aqueous suspension in which the precipitation step is to take place may be added before, during or after, preferably before, the addition of the fine particulate material and the mechanical agitation may be applied to the suspension of both fine particulate material and fibers.

Generally, we prefer to add the fine particulate material to an aqueous suspension of the fibers with vigorous mixing and then to add a lime slurry also with mixing and to form the required precipitate by carbonating the suspension so formed. However, it is also possible to add with mixing a portion of the lime slurry to an aqueous suspension of the fibers and to carbonate the suspension so formed and then to add with mixing the fine particulate material and a further portion of the lime slurry (together or either one before the other) and then to carry out a further carbonation step. A further possibility is that the fine particulate material may be added in more than one dose, each addition being accompanied by an addition of lime and a carbonation step being carried out after each lime addition (with or without fine particulate material).

If the water employed to provide the aqueous medium (eg. to provide the aqueous suspension employed in step (a)) in the method according to the first aspect of the present invention contains soluble or insoluble species which will affect the process of precipitation of the white pigment compound it may be desirable to carry out a preliminary precipitation step in the water prior to introduction of the said fine particulate material, eg. $TiO_2$, and/or the fibers which will form the composite pigment material together with the white pigment compound. For example, the employed water may be so-called white water from a paper making operation. The preliminary precipitation will entrain the species present in the white water in the manner described in EP604,095. A further preliminary precipitation step in which fibers but not added fine particulate material are present as described above may follow prior to precipitation in one or more steps in which the added fine particulate material is present. Up to 90% by weight, eg. from 0% to 50%, or 10% to 50%, by weight of the white pigment compound to be formed, may be precipitated in the preliminary precipitation step(s) prior to addition of the fine particulate material. The resulting final product formed will consist of a mixture of particles of the white pigment compound, some optionally containing also the fibers with no fine particulate material and some containing both the fine particulate material and fibers, others containing only the precipitate and species originally present in the water used. The product may also contain aggregates of two or more of the various kinds of precipitate particles possible.

As noted above, the precipitated white pigment compound may comprise an alkaline earth metal carbonate, especially calcium carbonate, which may conveniently be produced in a well known way by addition of a carbon dioxide-containing gas to an aqueous medium containing ions of the required alkaline earth metal (as well as the fine particles and the fibers when required). The aqueous medium may in this case comprise a medium containing a hydroxide of the required alkaline earth metal. Such a hydroxide may comprise a hydroxide of one or more of calcium, magnesium and barium. The aqueous medium could alternatively comprise a soluble salt of the alkaline earth metal, eg. calcium chloride or nitrate.

Where the aqueous medium comprises a hydroxide, the hydroxide may be separately prepared and added to the aqueous medium or alternatively may be prepared in situ in the aqueous medium, in each case, for example, by slaking an alkaline earth metal oxide (eg. calcium oxide or quicklime, when calcium hydroxide is desired). Where an alkaline earth metal oxide, eg. calcium oxide is to be slaked in an aqueous medium either separately or in situ in the reactor vessel, the oxide may previously be screened, eg. using a 125 $\mu$m screen, or a 53 $\mu$m screen, to separate large particles so that these are not present in the slaking process.

Where the aqueous medium comprises calcium hydroxide produced by slaking in an aqueous medium, the calcium hydroxide will itself be in the form of a suspension in the aqueous medium, ie. so called 'slaked lime'. Calcium ions will sparingly enter solution and will be continuously consumed and replaced as the precipitation reaction proceeds, eg. by addition of carbon dioxide. Preferably, a suspension formed in this way contains between 0.5 mole and 3.0 moles, especially from 1.0 to 2.0 moles, of the alkaline earth metal hydroxide. For slaking of lime, the temperature of the aqueous medium may be from 0° C. to 800° C. The temperature will rise during the slaking process. If the aqueous medium is not at the appropriate temperature after slaking, it may be heated or cooled to achieve the desired temperature before further use.

Efficient dispersion and dissolution of the alkaline earth metal hydroxide may also be assisted by agitation, eg. by stirring of the aqueous suspension, to provide uniform distribution of the particulate solid material comprising the hydroxide. This agitation may be combined with that applied to the particles of the fine particulate material and the fibers.

The source of the alkaline earth metal ions, eg. calcium oxide or calcium hydroxide (where the precipitated compound to be formed is calcium carbonate), may be added to water employed to form the aqueous medium before, during or after the addition of the fine particulate material. Where a batch reactor vessel is employed, we prefer to add the fine particulate material to the reactor vessel before adding a suspension of slaked lime to the vessel. The vessel may contain a suspension of pulp fibers when the fine particulate material is added. Water may be added after any of the individual addition stages.

Where an alkaline earth metal carbonate is to be precipitated by addition of $CO_2$ to an aqueous suspension containing a source of alkaline earth metal ions (and in at least part of the process also fine particulate material and fibers) the carbonation reaction may be carried out in a conventional vessel as is well known to those skilled in the art of precipitated carbonate production. Where the aqueous medium comprises slaked lime, the slaked lime suspension may be prepared in the vessel in which the carbonation is to be carried out, or in a separate vessel prior to introduction to the carbonation vessel.

The addition of a carbon dioxide-containing gas to an aqueous medium containing slaked lime (and, in at least part of the process, also fine particulate material and fibers) may be continued until the pH of the aqueous medium has fallen, eg. to a pH less than 9.0 preferably to a pH less than 7.5, eg. by monitoring the pH until it falls and then becomes stable. This indicates that all of the alkaline earth metal ions have been consumed, eg. by consumption of all calcium hydroxide present.

The reactor vessel in which the precipitation reaction is carried out to produce the composite material according to the second aspect of the present invention may take various forms depending on the process conditions required to be operated as described herein. Reactor vessels known in the prior art for the production of precipitated calcium carbonate from slaked lime and carbon dioxide gas may be employed. The reaction may be carried out as a batch, continuous or semi-continuous process as appropriate.

In its simplest form, the reaction vessel may be a container in which the various ingredients to be present in an aqueous suspension during the reaction may be added and mixed together in the vessel and $CO_2$ gas may be bubbled into the mixture.

The reaction may be carried out as a continuous or semi-continuous process in a cascade of reactor vessels. In such an arrangement an aqueous suspension containing lime, and where required fiber and fine particulate material such as $TiO_2$, may be delivered to the various vessels in sequence and carbon dioxide may be applied to each vessel whereby the required reaction takes place progressively along the sequence.

Another form of reactor which may be employed for a continuous or semi-continuous reaction is one in which the ingredients of the aqueous suspension and the final reactant, eg. carbon dioxide, are mixed together via one or more static mixers of a known kind, eg. in a known in-line arrangement. Doses of individual ingredients, eg. fibers, lime, fine particulate material, or carbon dioxide, as appropriate may be delivered via two or more mixers to give a sequence of ingredient additions whereby the reaction required takes place progressively in stages.

Preferably, during the reaction, or each stage of the reaction, especially where fine particulate material is present, mixing is applied. Gas such as $CO_2$ which is applied may be pressurized.

The use of a pressurized refiner as conventionally used for high shear agitation of pulp fibers for use in paper making may be employed for the precipitation reaction or reaction stages in a manner similar to that described in US00RE35460E (Klungness et al). Thus, a refiner having a feed hopper which is gas tight may be employed. An aqueous suspension of the solid ingredients may be delivered to the feed hopper together with carbon dioxide-containing gas under pressure. The suspension and gas may then be transferred together into a high shear mixing region which is conventionally employed to refine pulp fibers. The refiner may for example contain a conveying screw which transfers the ingredients to the high shear mixing region. The high shear mixing may be brought about by passing the aqueous suspension containing fiber, fine particulate material and reactants, eg. slaked lime and carbon dioxide, between the refiner members, which may comprise a moving member, eg. rotating a disc driven by a motor and another member, eg. another disc or plate, which may be moving or stationary. Each disc or plate may be provided with a known refining surface. The refiner may for example be a Sprout-Bauer pressurized disc refiner.

The aqueous medium in which the alkaline earth metal ions are contained and reacted with precipitate-forming reagent, eg. carbon dioxide, in the method according to the first aspect of the present invention may (in addition to fine particulate material and fibers in at least part of the process) also contain one or more chemicals of a kind known for use in precipitate production, eg. it may comprise a buffer solution to give the product so-called acid tolerance or a frothing agent to provide efficient reaction between $CO_2$ bubbles and lime.

The aqueous medium in which the composite pigment material is to be produced in the method according to the first aspect may, (in addition to added fresh particles of a fine particulate material and added fibers in at least part of the process) also contain other fine suspended solid material which may be in addition to any suspension of consumable particles employed to provide a source of alkaline earth metal ions. For example, there may be present other fresh or alternatively previously used pigment particles and/or fibers. For example, fines collected from a waste stream from a paper making process or a waste paper treatment or de-inking process as described in copending published patent applications EP604095 and EP737774 or derived from recycled paper, may also be present prior to any precipitation step involving the fine particulate material and, as noted hereinbefore, may be entrained by precipitation before the fine particulate material is present or, alternatively whilst the particulate material is present. Such fines may comprise used particles present in the waste stream such as organic particles such as ink, latex or polymer articles and/or inorganic particles such as mineral filler or coating particles as used in paper making or paper coating and/or fine fibers. Alternatively, or in addition, a selection of particles from a minerals refining or separation process or residue from an incineration process, eg. incineration of paper de-inking waste, may be present as described in PCT/GB96/00884. Where such other solid materials are included in the treated aqueous medium they may be present in an amount of up to 50% by weight, eg. 1% to 10% by weight, based on the dry weight of composite material product to be formed. Where such other solids are present in the suspension to be treated, such solids become entrained, together with the freshly added fine particulate material and the added fibers present, and bond to the precipitate crystals formed and thereby form a multi-media mixed aggregate solid system. The aggregate product so formed is useful in the paper making and paper coating applications described below.

Where a carbon dioxide-containing gas is employed to provide a carbonation reaction in the method according to the first aspect, the carbon dioxide-containing gas may be substantially pure carbon dioxide eg. as commercially supplied in a compressed gas cylinder or may be present in a mixture with other gases. The supplied carbon dioxide gas may be diluted with other inert gases, eg. air, nitrogen, etc. The carbon dioxide may be present as a mixture of spent gases such as flue gases, eg. obtained from a lime calcination plant in which quicklime is produced for conversion into slaked lime (for use in the process according to the first aspect). The gas may be applied under pressure, eg. in the manner described hereinbefore.

The temperature of the aqueous medium when the precipitate-containing composite material is formed therein, eg. when a carbon dioxide-containing gas is added thereto, is preferably in the range of from 1° C. to 80° C., especially 20° C. to 60° C., more preferably 30° C. to 55° C. Such an aqueous medium may be derived from used water from a paper making plant which may have an appropriate elevated temperature when delivered for use in the method of the present invention.

It is known, eg. as described in U.S. Ser. No. 355,038 (by two of the present co-applicants), that the reaction conditions employed to produce a precipitated calcium carbonate product can be selected to aim for a predominant precipitate crystal form, eg. scalenohedral, aragonite or rhombohedral, which will give increased brightness from the crystals when used in paper. Such reaction conditions may be selected and applied in operation of the method according to the first aspect of the present invention. However, since the reaction medium in which the crystals will precipitate in the method of the invention is not a homogeneous one, the crystal form of calcium carbonate achieved in practice in producing the composite pigment material is unlikely to be near to 100% of a selected form. It is quite usual for one crystal form even when predominant to be mixed with other forms. Such mixed forms will however generally give suitable product properties because the optical properties of the product will not result from the precipitate crystals alone.

The addition of a carbon dioxide-containing gas to an aqueous lime-containing suspension (with or without fiber and fine particulate material, as appropriate) may be continued until the pH of the aqueous medium has fallen, eg. to a pH less than 9.0 preferably to a pH of 7.5 or less, eg. by monitoring the pH until it becomes stable. This indicates that all of the alkaline earth metal ions have been consumed, eg. by consumption of all calcium hydroxide present.

The composite pigment material according to the second aspect of the present invention when produced is preferably obtained in the form of an aqueous suspension which preferably has a viscosity of not more than 500 mPa.s (as measured by a Brookfield Viscometer using a spindle speed of 100 rpm) and is preferably a pumpable and flowable slurry.

The aqueous suspension comprising the composite pigment material formed as a product in the method according to the first aspect of the present invention may be further processed for example by dewatering and/or by subjecting the composite-containing suspension to comminution, eg. rapid stirring, milling or grinding by one of several known procedures.

As described in EP768344A such a comminution step may be carried out by attrition grinding. In such grinding, the grinding medium employed in the comminution step may comprise one of the hard, inorganic materials well known in the grinding of particulate materials. For example, silica sand having a median particle diameter in the range from about 0.1 mm to 4 mm, eg. 0.2 mm to 2 mm, is a preferred grinding medium. The grinding medium could alternatively be aluminium oxide, zirconium oxide, hard steel or a mixture of any of these materials.

Comminution of the composite pigment material could alternatively be carried out using equipment available in the paper industry, eg. refiners or disintegrators or using a known milling method.

When the product comprising the composite pigment material is subjected to a comminution step the pH of the aqueous suspension containing the product being treated may rise, as described in EP768344A, eg. to pH 11 or more, as free basic material, eg. unconverted lime (where lime is used as the source of alkaline earth metal ions), entrapped in the crystalline structure comprising the composite material is released by the comminution. Such a pH level may be undesirable in the applications in which the material may be employed, as described hereinafter, because it is potentially harmful to machinery and to operators who have to process the suspension.

An additional step to reduce the pH of the aqueous suspension containing the composite pigment material may be applied after a comminution step. The additional step may be applied until the pH falls to a suitable level, eg. pH 10 or below, eg. pH 9 or below, preferably pH 7.5 or below. The additional step may comprise further treatment by carbonation of the precipitate-containing suspension. Alternatively, or in addition, a material known for use in reducing the pH of a mineral suspension may be added. Such a material may, for example, comprise a mild mineral acid such as phosphoric acid.

The aqueous suspension containing composite pigment material product formed in the method according to the first aspect of the present invention may be treated so as to separate partially or fully the aqueous host medium from the composite material solids using one or more separation processes which may be known processes. For example, processes such as filtration, sedimentation, centrifugation or evaporation may be used. Filtration using a filter press is usually preferred. The separated aqueous medium, eg. water, may, optionally with further purification or clarification by one or more chemical, biochemical or mechanical processes which may be known per se, may be recycled for reuse, eg. in a paper mill, eg. for use in diluting the paper making stock or for use as showers for washing machinery. The separated solids may be assessed for quality control by measurements taken on samples and subsequently delivered to a storage tank and thereafter supplied as necessary for use in a user application, eg. as described hereinbefore. The solids-containing suspension may be re-diluted for use at the user plant.

It is not necessary for an aqueous suspension containing a composite pigment material according to the second aspect of the present invention to be dewatered prior to supply for use in a user application, eg. for use in paper making in a paper mill. The aqueous suspension or slurry may be delivered to a storage tank or directly to the user plant without substantial dewatering.

Where the composite pigment material is to be used as a filler in a paper making composition, the composite material may be supplied to the paper making mill in one of various concentrations in water. The concentration may range from dilute suspension form to dry particulate solids. The composite pigment material after preparation in the method according to the first aspect of the present invention may or may not be treated as appropriate, eg. by dewatering or not, so that it may be delivered to the user plant, eg. paper making mill, in the required concentration.

The extent of dilution or concentration of the form in which the composite pigment material product is added to the user composition, eg. paper making furnish composition, does not critically affect the properties of the resulting product, eg. paper sheet. It may, however, for economic and practical reasons be more suitable to supply the composite pigment material product in the form of a concentrated pumpable aqueous slurry. Where this product is supplied for use in a process at another location it may be preferable or desirable to dry the product prior to transport. Where the product is supplied to a nearby plant it is likely to be delivered in slurry form. Where this product has been concentrated or dried prior to delivery and subsequently re-dispersed in or diluted with clean water prior to re-use, the concentration and dilution steps do not materially affect the usefulness of the product.

In any event, where the composite pigment material product is to be used as a pigment filler material in paper making, this product may, as will be clearly evident to those familiar with the paper making art, be used in a well known manner. It may be blended in various proportions with conventional filler materials, eg. precipitated or natural, eg. ground, calcium carbonate, kaolin or other clay, metakaolin, talc, calcium sulphate etc., the ingredients and composition as well as the host cellulosic fibers being selected according to the quality of paper required to be produced. In general, these materials are likely to be in slurry form when they are mixed. The host cellulosic fibers may be of the same kind as used in step (a) of the method according to the invention (although the extent of beating does not need to be as for the fibers in step (a)). As noted hereinbefore, part or all of the fibers may be large fibers from which a fines fraction has previously been separated for use in producing the composite pigment material.

The paper maker will normally select the concentration of the composite pigment material (produced in accordance with the present invention) used in aqueous suspension form and the delivery rate of the suspension at the point of addition to the paper making composition, eg. furnish. As noted above, this may require re-dilution of a suspension which has been delivered to the paper mill in concentrated form. Generally, the composite pigment material may form up to about 40%, usually up to about 30%, by weight of the solids content of the paper making composition on a dry weight basis. Where other fillers also form part of the filler content of the paper making composition a total filler composition of up to 40% by weight of the solids content of the paper composition may be employed. The composite pigment material according to the second aspect may form from 1% to 100% by weight of the added filler on a dry weight basis. Production of a paper sheet using the paper making furnish is, of course, carried out in a well known manner.

Where the composite pigment material according to the second aspect of the present invention is to be employed as a pigment material in a paper coating composition, the composition will generally comprise an aqueous suspension of pigment, including the composite pigment material according to the second aspect and optionally other known ingredients, mixed together with a hydrophilic adhesive and optionally other known ingredients. The composite pigment material employed in the composition may be mixed with one or more conventional pigments, eg. as described above. The adhesive may form from 4% to 30%, especially 4% to 15%, by weight based on the total dry weight of pigment or pigments present. The adhesive may be one of the known paper coating adhesives employed in the art, eg. chosen from the group consisting of starches, proteinaceous adhesives such as casein and latices of, for example, styrene butadiene rubbers and acrylic polymers.

The paper coating composition may also include one or more of the various well known optional additives conventionally used in paper coating compositions, eg. a thickener, eq. in an amount of up to 2% by weight based upon the total dry weight of pigment or pigments present, up to 1% by weight of a soluble binder, a lubricant, eg. sodium stearate forming 0.5% of the weight of pigment present, and/or soluble binder and/or an insolubiliser forming up to 1% by weight of binder present.

The paper coating composition may be formed by mixing together an aqueous dispersed suspension of the composite pigment material optionally with one or more further aqueous dispersed suspensions containing other pigments, with the adhesive and any other optional constituents, eg. thickener and/or lubricant and/or soluble binder and/or insolubiliser, in a manner familiar to those skilled in the art. Use of the coating composition formed to coat a paper or other sheet material is of course carried out in a well known manner, eg. using one of the many coating machines employed in the prior art.

Precipitation of calcium carbonate in a fines-containing aqueous waste suspension, eg. obtained from a paper making waste stream, is described in EP658606B (equivalent to U.S. Ser. No. 355038 by two of the present co-applicants). The aqueous suspension in the process described therein may contain waste fines which include fine fibers and fine inorganic materials which may incidentally include a very small concentration of $TiO_2$ particles or other fine particulate materials. However, generally, since these fines are used materials, they may have been produced from a variety of waste streams and therefore may be of variable composition and concentration, and they are not suitable to provide (on their own) sources of the fine particulate material and fibers of the quality required of the fresh particles and fibers as used in the present invention. Fine particulate material such as $TiO_2$ derived from such waste streams will generally be agglomerated and coagulated because of the presence of a variety of polymeric chemical additives in the waste stream and will not therefore show the benefits obtained by forming the novel composite pigment material (according to the second aspect of the present invention) from fresh particles of fine particulate material and fibers (at least a proportion of which are desirably from virgin pulp) as well as bonded precipitated white pigment compound such as $CaCO_3$ as described hereinbefore. However, as noted above, it is possible that the aqueous medium employed in the method according to the first aspect of the present invention may optionally contain such fines which will then constitute part of the composite pigment material produced.

Embodiments of the present invention will now be described by way of example only with reference to the following illustrative Examples and with reference to the accompanying drawings, wherein:

ILLUSTRATIVE EMBODIMENTS OF THE INVENTION

Example 1

Section 1a. Preparation of Filler

Figure 1:
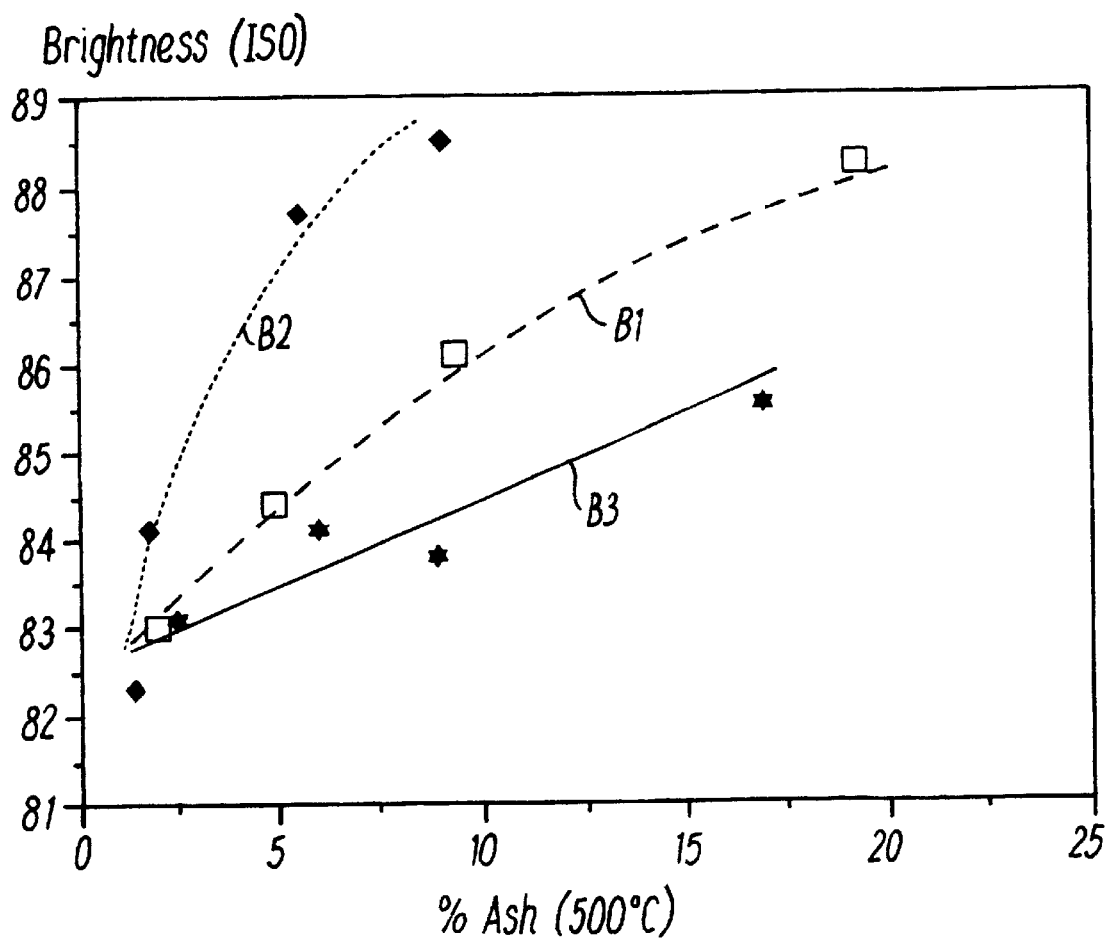
FIG. 1 is a graph of ISO brightness plotted against filler additive concentration (measured as ash at 50° C.) for various filler additives in paper handsheets.

A pulp (beaten fiber from Canada) slurry was made at a solids concentration of 1.65 weight per cent. To a 10000 ml reactor vessel fitted with a stirrer, we added 8333 ml of the pulp slurry. Then, 15 grams of anatase titanium dioxide (Tiona $TiO_2$, RGM SCM Chemicals) was added to the reactor. The reactor stirrer was turned on for 2 minutes operating at 700 rpm. After dispersing the titanium dioxide by stirring, we added to the reactor vessel 637 ml of a slurry of slaked lime containing a solids content of 14.7% by weight and also 1005 ml water. The temperature of the reactor vessel was raised to 45° C. and the stirring was continued again at a rate of 700 rpm. Carbonation was begun at this temperature and stirring rate by passing carbon dioxide gas through the suspension in the reactor at a rate of 2.05 $l.min^{-1}$ $CO_2$. Carbonation was continued until the pH, which was periodically checked with a phenolphthalein indicator, was found to give no indicator colour change. After the pH was detected in this way to have become stable, we continued to carbonate for a further 5 minutes. We examined the composite pigment material produced as a solid product by this reaction by scanning electron microscopy and X-ray microanalysis. The micrographs obtained show $TiO_2$ particles to be dispersed and bonded within a composite bonded fiber/calcium carbonate matrix.

Section 1b. Preparation of Paper Sheets

A cellulose fiber pulp slurry having a solids content of 0.3 weight per cent was used as stock furnish. The pH of this stock was kept at 7.0. (No adjustment of pH was made after subsequent adding of filler). The fiber stock used to produce the pulp was as used in Section 1a to produce the composite pigment material. An aqueous slurry of anatase titanium dioxide (Tiona $TiO_2$ RGM, SCM Chemicals) containing 10% by weight solids was made. An aqueous slurry containing 2.75% by dry weight of the new composite pigment material produced as a product in Section 1a was also prepared. A 1% solution of a cationic emulsion copolymer (Hydraid 954 produced by Calgon Corporation) was also made for use as a filler retention aid in the making of paper sheets. Paper handsheets were made using the pulp slurry with the slurry of $TiO_2$ (as comparative sheets) and the slurry of composite pigment material produced as a product in Section 1a alternatively incorporated as paper filler slurry together with the filler retention aid. In each case the mineral content of the added filler in the paper composition was sufficient to give an ash content of 8.1% by weight at 500° C.

Handsheets A1, made using as additive the composite pigment material produced as in Section 1a, and handsheets A2, made using as additive the $TiO_2$, were made using a British standard handsheet former in accordance with TAPPI standard T205 cm-88. The handsheets were each pressed twice in order to squeeze out as much water as possible, and dried in a drum drier. The grammage was kept around 80 gsm and the paper sheet formation was kept around 100 as measured by an OpTest instrument, which is an instrument made by OpTest Instrument Inc.

Section 1c. Handsheet Measurements and Results

The optical and physical properties of the handsheets were measured in a paper testing laboratory utilising standard TAPPI testing procedures.

The brightness obtained for handsheets A1 made with the new composite pigment material produced as in Section 1a (value 84.75 ISO units) surpassed that obtained with the handsheets A2 made with titanium dioxide (value 83.6 ISO units).

Opacity of handsheets A1 (value of 89.52) was found to be greater than that of comparative handsheets A2 (value 88.6).

Burst index of handsheets A1 (value 35.5) was found to be greater than that of comparative handsheets A2 (value 28.1).

Gurley porosity of handsheets A1 (value 82.2) was found to be greater than that of comparative handsheets A2 (value 13.4).

The pigment scatter of the handsheets A1 incorporating the composite pigment material produced as in Section 1a was higher than the scatter of the titanium dioxide in the comparative handsheets A2. The calculated theoretical scatter $S_{TiO2}$ for the titanium dioxide contained as an embedded constituent in the new composite pigment material may be determined approximately by using the following equation:

$$S_{TiO2} = (S - 0.9 S_{CaCO3})/0.1 \qquad \text{Equation (1)}$$

where S is the measured scattering coefficient for the composite pigment, and $S_{CaCO3}$ is the theoretical scattering coefficient for precipitated calcium carbonate. Assuming the scattering coefficient of the calcium carbonate, $S_{CaCO3}$, to be around 2300 cm$^2$.g$^{-1}$ (m$^2$.kg$^{-1}$), (a typical value given in the published literature) we can calculate that scattering contributed by the titanium dioxide is about 13,120 cm$^2$·g$^{-1}$ (as measured for TiO$_2$ well distributed as a paper filler at less than 1% filler levels). This is approaching the maximum scattering for titanium dioxide in a very finely and unagglomerated state in a typical furnish comprising largely beaten woodfree fibers. Therefore, the new composite pigment material improved the optical and physical properties of its constituent titanium dioxide.

Example 2

Section 2a. Preparation of Filler

Pulp in a pulp slurry was beaten to have a CSF (Canadian Standard Freeness) value of about 300. The resulting fibers consisted of about 20% by weight fines and 80% by weight longer fibers. The slurry was diluted to a solids concentration of 5 weight per cent. To the reactor vessel as employed in Section 1a of Example 1 we added 8000 ml of the resulting pulp slurry. 40 g of TiO$_2$ (Dupont, rutile) and 76 ml of water were added. The resulting suspension was stirred for 2 minutes at a stirring speed of 700 rpm. 1852 ml of the same lime slurry as used in Section 1a was added. The temperature of the reactor vessel contents was raised to 45° C. whilst stirring of the contents was continued at 700 rpm. A composite pigment material was formed by precipitating calcium carbonate crystals in the stirred suspension in the reactor vessel in the same manner as in Section 1a of Example 1 (except that in this case the delivery rate of carbon dioxide was 6 litres per minute).

Micrographs of samples of the composite pigment material produced, showed, as in Example 1, that TiO$_2$ particles were dispersed and embedded within a bonded matrix of fibers and calcium carbonate crystals constituting a new composite pigment material.

Section 2b. Preparation of Handsheets

Three types of handsheet were made in the same manner as in Section 1b of Example 1. In this case, various concentrations of additive to provide filler in the paper furnish composition were added and measured as percentage by weight ash at 500° C. Three types of additive separately employed to form the compositions to make the handsheets were (i) composite pigment material as produced in Section 2a to form handsheets "B1"; (ii) Rutile TiO$_2$ (of the kind used in Section 2a) to form a comparative handsheets "B2"; and (iii) scalenohedral precipitated calcium carbonate to form comparative handsheets "B3".

Section 2c. Measurements and Results

Figure 2:
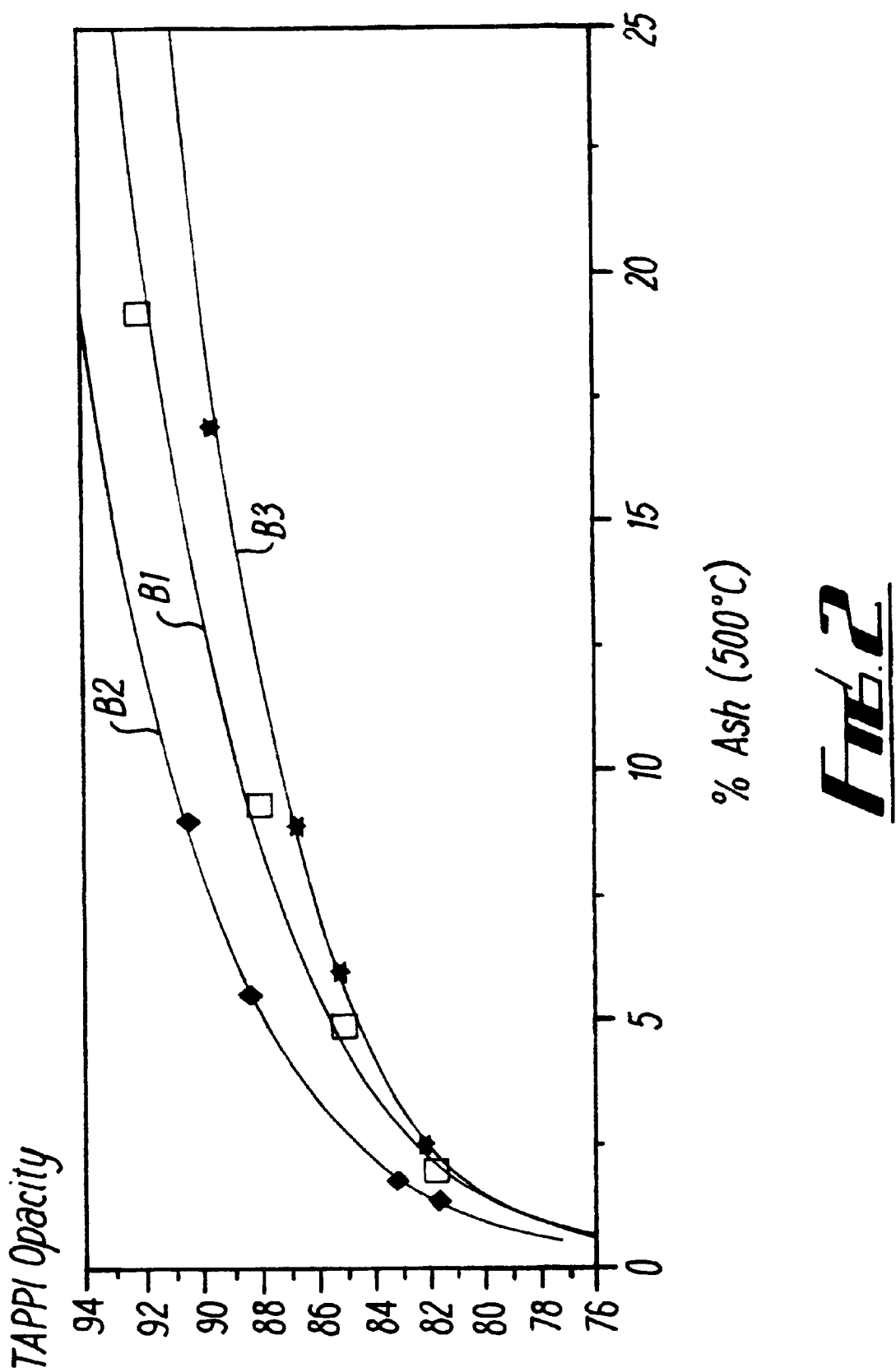
FIG. 2 is a graph of TAPPI opacity plotted against filler additive concentration (measured as ash at 500° C.) for various filler additives (as for FIG. 1) in paper handsheets.
Figure 3:
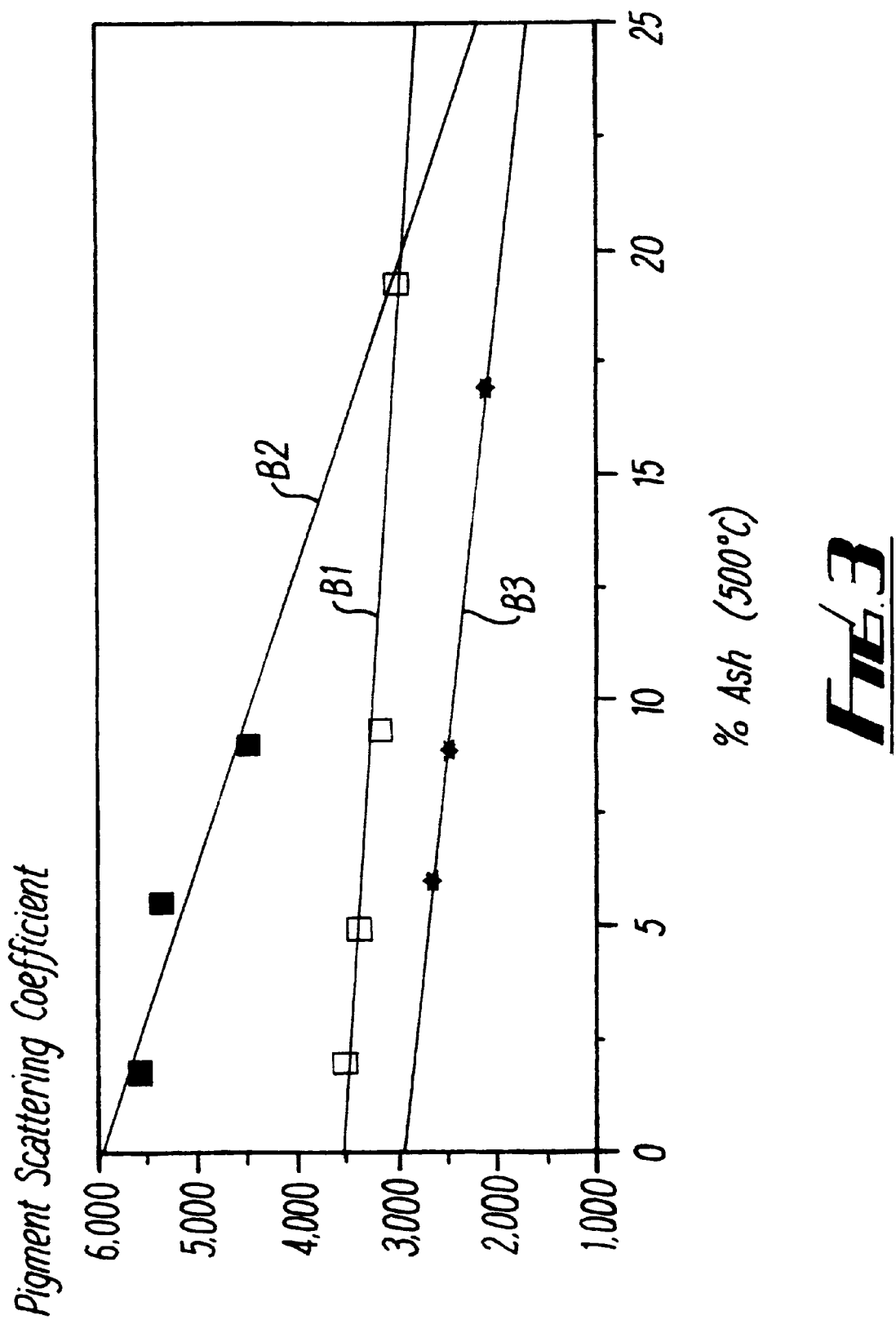
FIG. 3 is a graph of scattering coefficient plotted against filler additive concentration (measured as ash at 500° C.) for various filler additives (as for FIGS. 1 and 2) in paper handsheets.

The ISO brightness and opacity of the handsheets prepared as in Section 2b were measured using standard TAPPI procedures. From these results the scattering coefficients were plotted against additive mineral concentration (measured as ash at 500° C.) The results re shown in FIG. 1 (ISO brightness), FIG. 2 (opacity) and FIG. 3 (scattering coefficient). Curves labelled B1, B2 and B3 in each of FIGS. 1 to 3 respectively represent the results for handsheets B1, B2 and B3.

By use of Equation 1 above, we have calculated the apparent TiO$_2$ contribution to scattering coefficient in the new composite pigment material (in Handsheets B1) to be about 10,435 cm$^2$.g$^{-1}$.

Next, we measured the single pass retention of each additive in the making of handsheets B1 and B2. According to TAPPI procedures, the retention in each case may be obtained by incinerating at 500° C. a handsheet sample (HS) and also a sample of furnish composition (FC) representing material employed to make the handsheet sample and measuring the percentage of ash derived from mineral contained in HS divided by the percentage of ash derived from mineral in FC (×100 to give a percentage). The results for handsheets B1 and B2 are shown in Table 1 as follows.

TABLE 1

Retention at 10% additive or filler level

| Additive | Handsheet | Retention (%) |
| --- | --- | --- |
| Composite pigment material (Section 2a product) | B1 | 80 |
| Titanium dioxide (Rutile) | B2 | 33 |

As can be seen from Table 1, the single pass retention of TiO$_2$ in a paper sheet production can be considerably improved by incorporating the TiO$_2$ in a composite material embodying the present invention.

Finally, in order to check that the product of Section 2a is composed of TiO$_2$ and calcium carbonate as expected (as mineral or inorganic content—present together with organic fibers) we incinerated several handsheets B1 at 900° C. to leave ash. CaCO$_3$ present is converted to CaO by this further incineration and the weight loss indicates the amount of CaCO$_3$ present. We also carried out the same procedure with handsheets formed from the fibers with no mineral additive included to investigate the mineral content of the unfilled fibers. Using X-ray fluorescence analysis we showed that the added composite pigment material which is the product of Section 2a used in making handsheets B1 contained as mineral constituents 9% by weight TiO$_2$ and 91% by weight CaCO$_3$ which, within experimental error, is as expected.

Example 3

A composite pigment material M1 embodying the invention was produced in a manner similar to that described in Section 1a except that the rate of delivery of carbon dioxide was twice that used in Example 1. Another composite pigment material M2 embodying the invention was also produced in the same manner as M1 except that the pulp (treated as in Section 2a to give 20% fines) employed to produce M1 was, for M2, beaten further until a fines content of 53% by weight was obtained. Handsheets were made using M1 and M2 and the optical properties (brightness and opacity) were measured as in Section 2a.

The scattering coefficient versus additive concentration (measured as % by weight ash at 500° C.) was calculated and plotted for the handsheets made from M1 and M2 respectively. The curves obtained are shown in FIG. 4 wherein the symbols M1 and M2 designate respectively the curves for the handsheets made from composite pigment materials M1 and M2.

Figure 4:
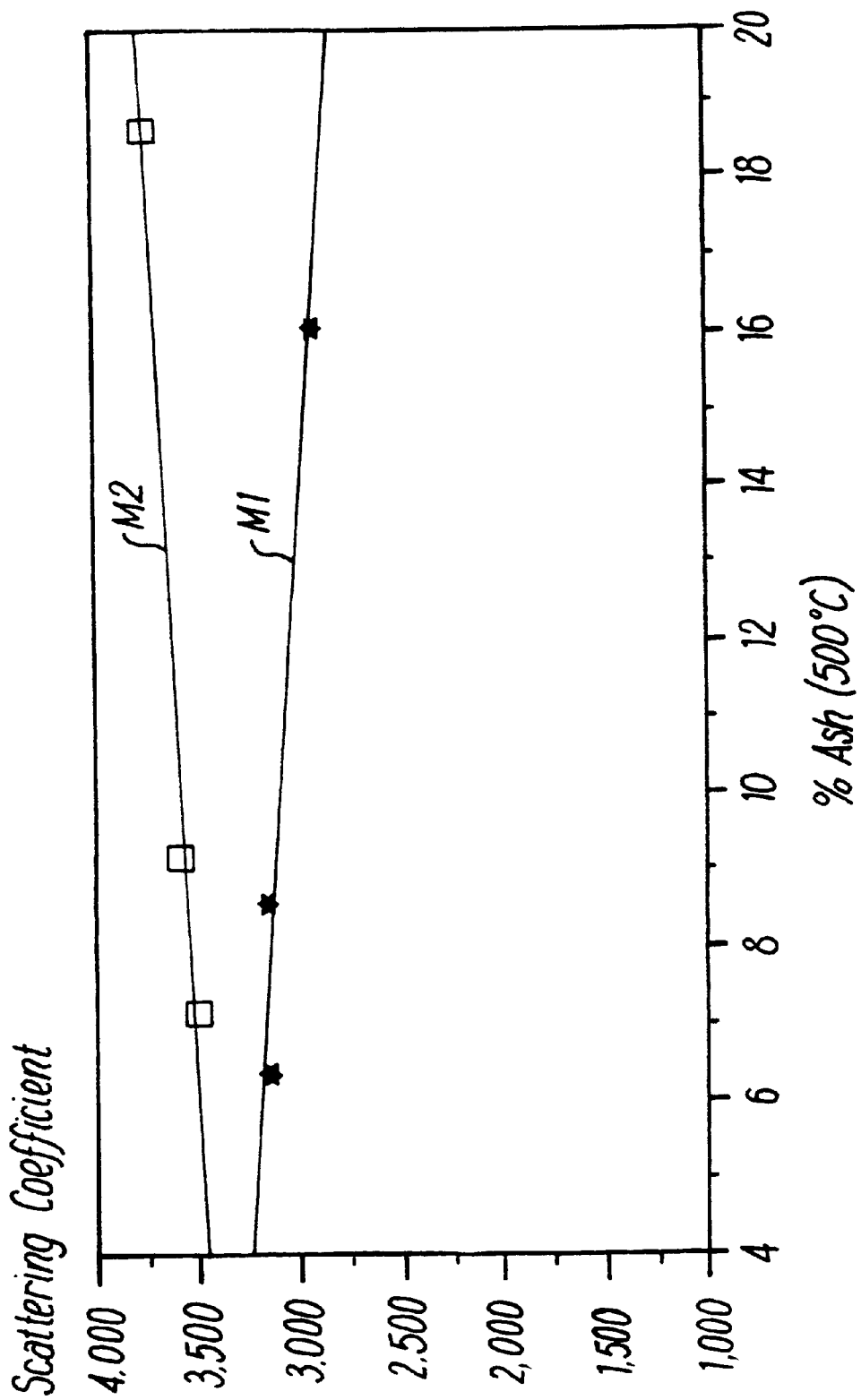
FIG. 4 is a graph of scattering coefficient plotted against additive concentration (measured as ash at 500° C.) for two different aggregate materials embodying the invention.

As seen in FIG. 4, the scattering coefficient obtained is greater using a greater proportion of fibers which are fines in the composite pigment material (M2).

Example 4

A composite pigment material was produced from hardwood pulp fibers, $TiO_2$ and precipitated calcium carbonate generally in the manner described in Example 1 using the following process conditions:

(a) carbonation reaction temperature 45° C.
(b) mixer speed before and during carbonation reaction 700 rpm
(c) target product suspension volume 10 liters
(d) target product suspension solids concentration (dry weight) 8.0%
(e) feed solids concentration (dry weight) 5.0%
(f) fibers used beaten to 300 CSF
(g) $TiO_2$ weight 40 grams
(h) lime slurry volume 1852 ml
(i) target product calcium carbonate content 50% by weight
(j) $CO_2$ delivery rate 6.0 $lmin^{-1}$ Micrographs of the new composite pigment material embodying the invention produced were obtained. These showed the formation of a satisfactory coarse precipitate on the fiber surfaces, the $TiO_2$ particles being dispersed within the fiber/$CaCO_3$ matrix.

Paper handsheets were made and examined as in Section 1b and 1c of Example 1. The results in Table 2 as follows were obtained for the composite pigment scattering in the sheets as a function of composite pigment material loading of the sheets.

TABLE 2

| Scattering coefficient ($cm^2 \cdot g^{-1}$) | Mineral ash content (500° C.) (% by weight) |
|---|---|
| 3,000 | 6 |
| 2,920 | 11 |

Example 5

A composite pigment material was prepared and investigated as in Example 4, except that in this case the reaction temperature was at the lower value of 27° C.

The micrographs obtained showed that the precipitate formed in the composite pigment material product appeared finer and less satisfactory than that obtained in Example 4. The scattering coefficient of the composite pigment in handsheets was as in Table 3 as follows.

TABLE 3

| Scattering coefficient ($cm^2 \cdot g^{-1}$) | Mineral ash content (500° C.) (% by weight) |
|---|---|
| 2,040 | 6.8 |
| 2,020 | 11.5 |

Generally, the scattering coefficient values obtained as shown in Table 3 are inferior to those obtained for the product obtained using a higher reaction temperature as set out in Table 2 (Example 4).

Example 6

The procedures described in Example 4 were repeated except that in this case the $TiO_2$ was not dispersed in the pulp slurry by mixing prior to adding the lime. The product obtained showed signs of flocculation of the $TiO_2$ particles and the scattering values obtained for paper sheets were inferior to those obtained in Example 4.

Example 7

The procedures described in Example 4 were repeated except that in this case the feed solids concentration was reduced to 2.5% by dry weight. The carbon dioxide application rate was also reduced to compensate for the reduced quantity of lime present. The results obtained were similar to those obtained as in Example 4.

Example 8

A composite pigment material was produced from hardwood pulp fibers, $TiO_2$ and precipitated calcium carbonate generally in the manner described in Example 1 using the following process conditions:

(a) target fiber:calcium carbonate ratio by weight in product 75:25
(b) carbonation reaction temperature 45° C.
(c) mixer speed during reaction 700 rpm
(d) target product suspension volume 1 liter
(e) target product solids concentration (dry weight) 3.2%
(f) fibers used beaten to 300 CSF
(g) lime slurry volume 370 ml
(h) $TiO_2$ weight 8 grams
(i) feed solids concentration (dry weight) 2.5%

Paper sheets were prepared and investigated as in Sections 1b and 1c. The scattering coefficient of the composite pigment material in the sheets measured as a function of pigment loading was as shown in Table 4 as follows.

TABLE 4

| Scattering coefficient ($cm^2 \cdot g^{-1}$) | Mineral ash content (500° C.) (% by weight) |
|---|---|
| 2,400 | 3.5 |
| 2,350 | 7.0 |
| 2,350 | 9.0 |

Example 9

The procedure of Example 8 was repeated except that in this case the target fiber:calcium carbonate ratio of the product was 25:75 and the $TiO_2$ weight was 30 grams (to achieve the same $TiO_2$ to $CaCO_3$ ratio as in Example 8). The lime slurry volume was 1,389 ml. Paper sheets were prepared and investigated as in Sections 1b and 1c and the scattering coefficient of the pigment material in the sheets was found to be as in Table 5 as follows.

TABLE 5

| Scattering coefficient ($cm^2 \cdot g^{-1}$) | Mineral ash content (500° C.) (% by weight) |
|---|---|
| 3,350 | 4.5 |
| 3,280 | 7.6 |
| 3,240 | 10.5 |
| 3,010 | 22.5 |

The results shown in Table 5 using a high $CaCO_3$ content in the composite pigment material are superior to those shown in Table 4 obtained using a low $CaCO_3$ content.

Examples 10 to 22

In Examples 10 to 22 the following general procedure was used to prepare composite pigment material samples embodying the invention.

A weighed amount of pulp fiber refined to 50 CSF was placed into a 10 l reactor and was diluted with approximately 8 l of water to give a fiber consistency (dry solids concentration) of 0.5% by weight. The pulp suspension was stirred continuously at a mixing energy of about 5 kWm$^{-3}$ and the required weight of $TiO_2$ was added as a slurry; mixing to disperse the $TiO_2$ in the fiber suspension was continued. Slaked lime slurry was then metered into the reactor to give, after carbonation, the required calcium carbonate:$TiO_2$ ratio. The temperature of the reactor was raised to that required for the carbonation reaction and was then stabilized. Carbon dioxide gas was then applied at a flow rate calculated to convert all the slaked lime into calcium carbonate in 15 minutes. The temperature of the precipitation reaction was thermostatically controlled and the pH was monitored. Table 6 as follows summarizes further selected conditions used in these Examples.

TABLE 6

| Example No. | Fiber solids concentration (wt %) | $TiO_2$ solids concentration (wt %) | Target product composition fiber/$TiO_2$/$CaCO_3$ | Reaction temperature (° C.) |
|---|---|---|---|---|
| 11 | 0.5 | 0.05 | 50/5/45 | 20 |
| 12 | 0.5 | 0.05 | 50/5/45 | 35 |
| 13 | 0.5 | 0.05 | 50/5/45 | 50 |
| 14 | 0.5 | 0.05 | 50/5/45 | 35 |
| 15 | | | 10/50/40 | 35 |
| 16 | 0.1 | 0.5 | 10/50/40 | 35 |
| 17 | | | 10/50/40 | 35 |
| 18 | | | 10/55/35 | 35 |
| 19 | 0.25 | 0.825 | 50/16.5/33.5 | 35 |
| 20 | 0.25 | 0.05 | 50/10/40 | 35 |
| 21 | 0.25 | 0.025 | 50/5/45 | 35 |
| 22 | 0.2 | 0.025 | 45/5/50 | 35 |
| 23 | 0.3 | 0.025 | 55/5/40 | 35 |

The product compositions of composite pigment material obtained were verified by (a) EDTA titration for calcium carbonate; and (b) ashing at 500° C. to 600° C. and then at >900° C. whereby (a) the mineral content and then (b) the $CaCO_3$ content (converted into CaO) could be determined. The composite pigment products obtained in each of Examples 10 to 22 were employed and investigated in paper sheets as in Sections 1a and 1b in Example 1. Comparative sheets were also made in a similar manner using as pigment respectively $TiO_2$ (as used in the production of the composite pigment material) and precipitated calcium carbonate (pcc). Various amounts of the commercially available retention aid chemical TRP954 (Calgon Corporation) were used. TRP954 is a general purpose cationic copolymer retention aid. This was applied either in a low dose (0.005 wt %) or in a high dose (0.05 wt %).

Figure 5A:
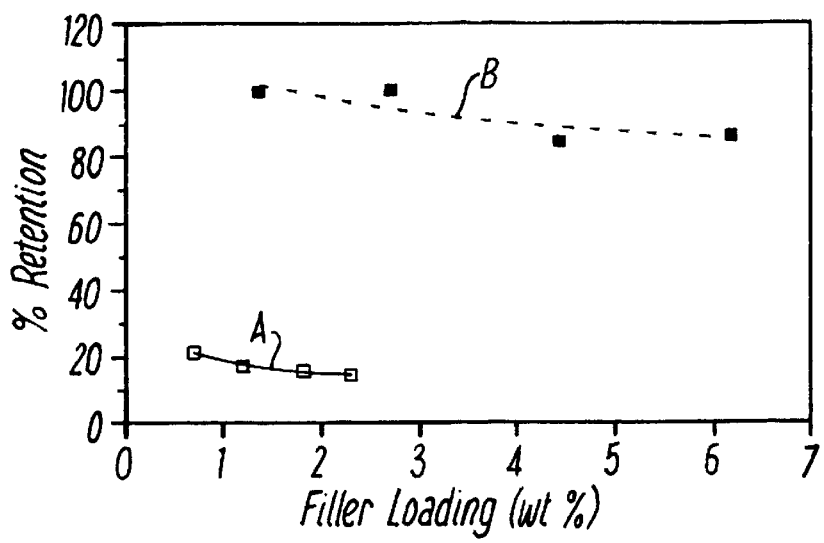
FIGS. 5a, 5b and 5c are comparative graphs of filler one pass retention versus filler loading for prior art pigments (5a and 5b) and pigment material embodying the invention (5c) in paper sheets.
Figure 5B:
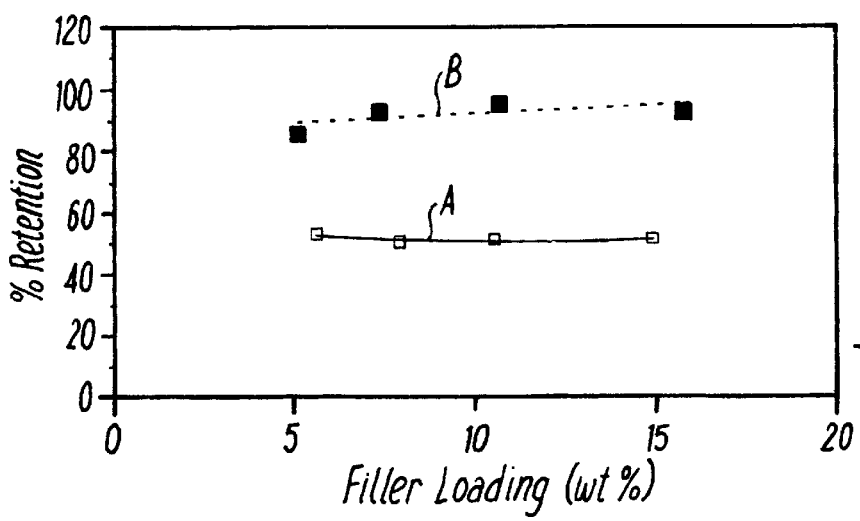
Figure 5C:
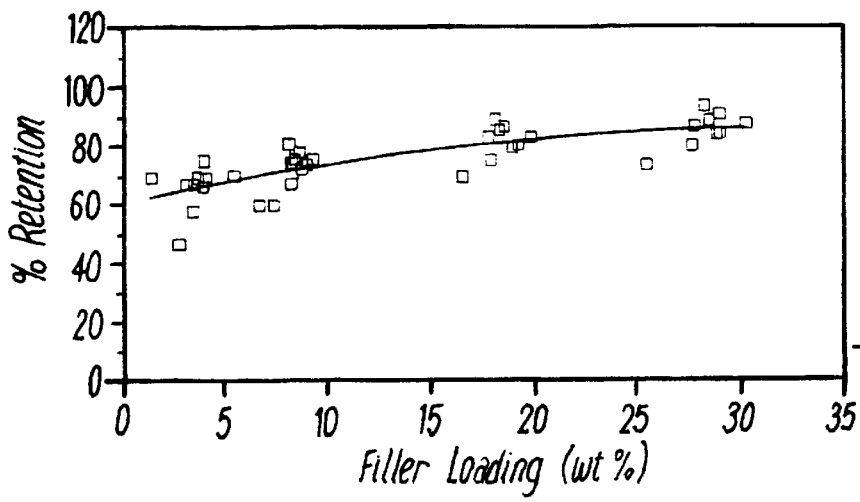
Figure 6A:
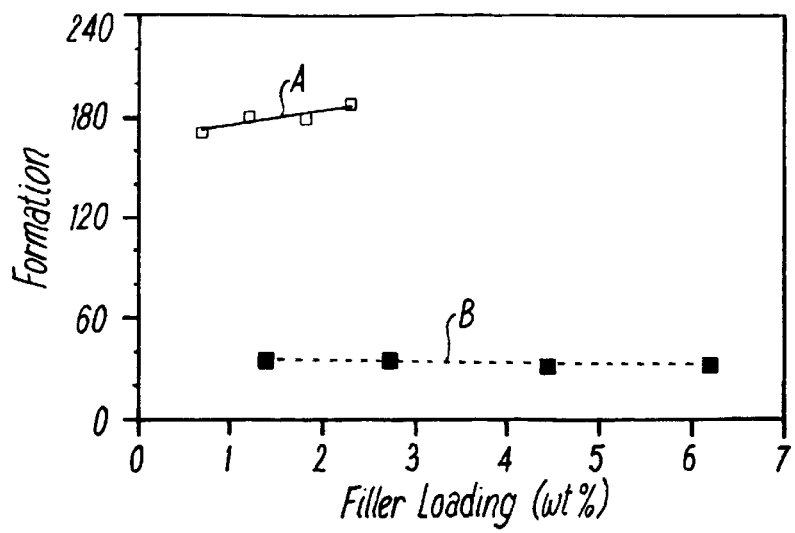
FIGS. 6a, 6b and 6c are comparative graphs of sheet formation versus filler loading for the paper sheets incorporating pigments whose retention properties are shown in FIGS. 5a to 5c.
Figure 6B:
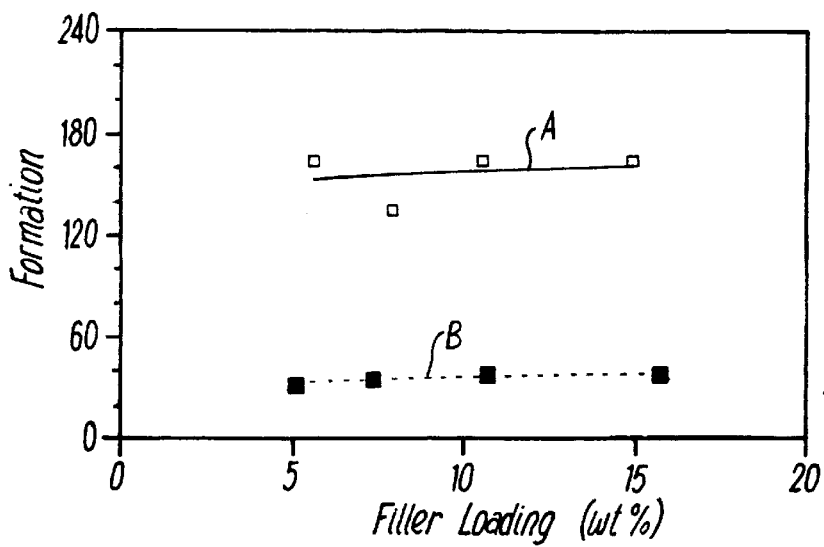
Figure 6C:
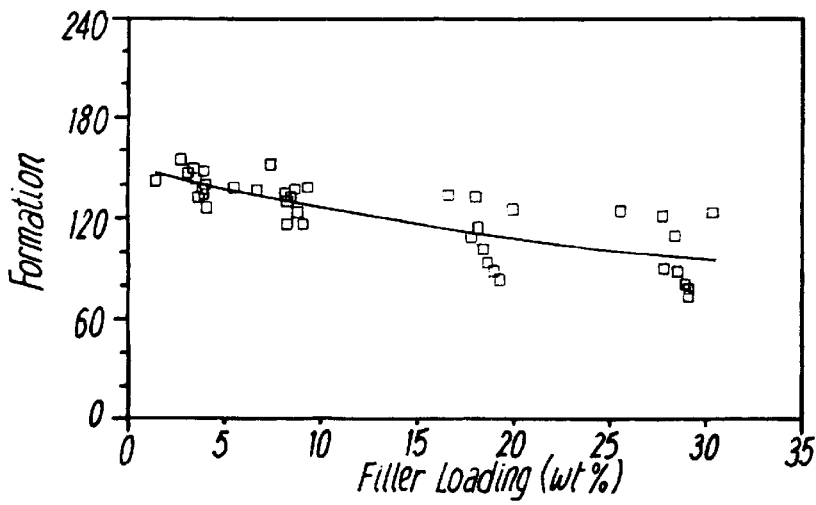
Figure 7A:
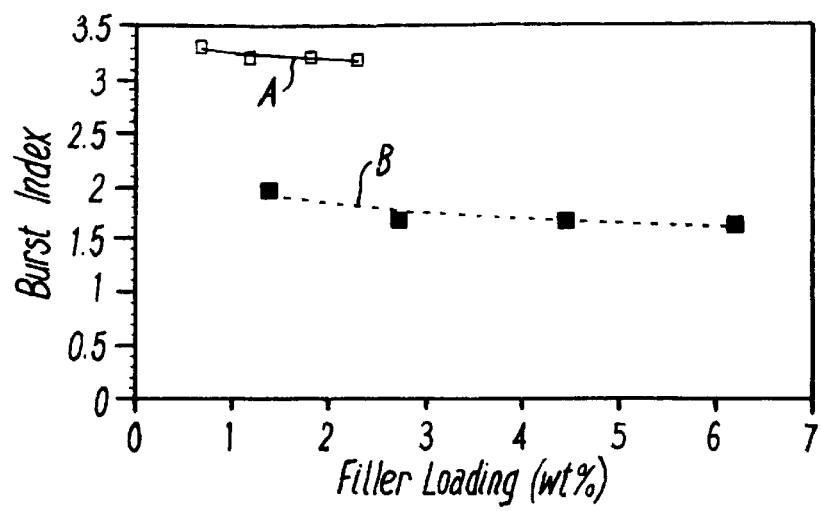
FIGS. 7a, 7b and 7c are comparative graphs of sheet burst index versus filler loading for the paper sheets incorporating pigments whose retention properties are shown in FIGS. 5a to 5c.
Figure 7B:
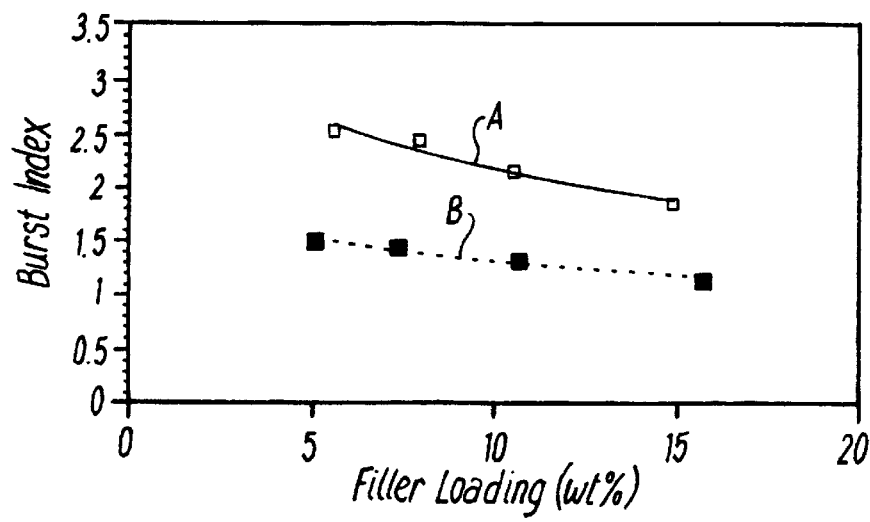
Figure 7C:
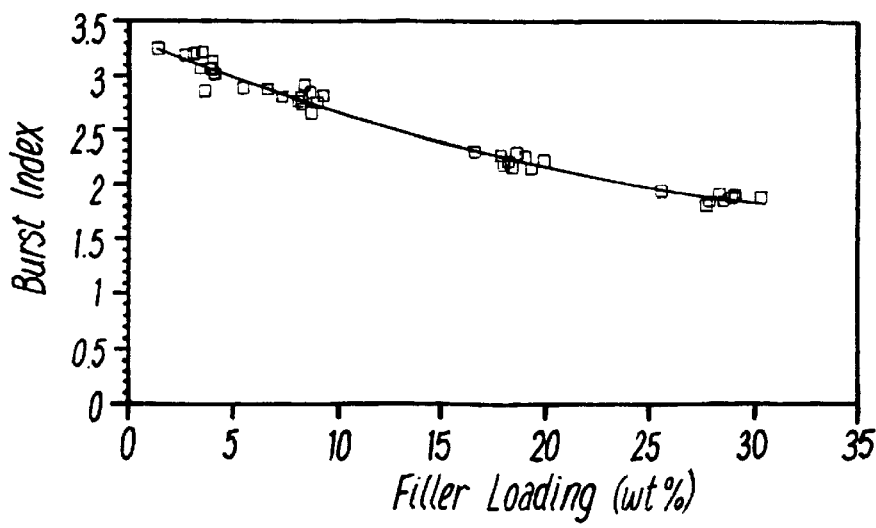

The results are shown graphically in FIGS. 5, 6 and 7. The individual points on each curve in FIGS. 5, 6 and 7 represent individual samples at given filler loadings in each sheet. In FIG. 5(c) (and FIGS. 6c and 7c) the individual samples represented on the curves are products from Examples 10 to 22 applied at various filler loadings.

The one-pass retention of the three pigments viz:

(a) $TiO_2$ only (prior art);

(b) pcc only (prior art); and (c) composite $TiO_2$/fiber/pcc pigment (invention embodiment);

in similarly made TAPPI standard paper sheets was measured in the manner described in Section 2c and the results are displayed in FIGS. 5a to 5c (results for $TiO_2$, pcc and composite pigment respectively). Curves A and B in FIGS. 5a and 5b represent respectively use of a low and high dose of TRP954 with the pigment. The dose of TRP954 used with the new composite pigment material (FIG. 5c) was low only (0.005% by weight).

As seen in FIGS. 5a to 5c, the retention of the new composite pigment material (FIG. 5c) is superior to that obtained using the same low dose of TRP954 (0.005%) with respectively $TiO_2$ (curve A, FIG. 5a) and pcc (curve A, FIG. 5b). The retention for $TiO_2$ and pcc may be raised by increasing the content of TRP954 retention aid as illustrated by curve B in FIGS. 5a and 5b. However, this has deleterious effects on sheet formation as illustrated in FIGS. 6a and 6b, and burst strength as illustrated in FIGS. 7a and 7b. Thus, increasing the retention aid dose causes the formation and burst index to fall to unacceptably low levels as seen by curve B in FIGS. 6a, 6b, 7a and 7b (compared with curve A in each case for low TRP954 dose). In contrast, as illustrated in FIGS. 6c and 7c, the formation and burst index obtained with the new composite pigment material (using a low dose of TRP954) remains high compared to the levels for $TiO_2$ and pcc in curves B in FIGS. 6a, 6b, 7a and 7b. This demonstrates surprisingly that a beneficial combination of good retention, formation and burst strength is obtained with the composite pigments embodying the invention in the production of paper sheets.

The optical properties of paper sheets prepared using the products of Examples 10 to 22 were determined (in the manner described in Section 1c), including the scattering coefficient of the new composite pigment and also the effective scatter of the $TiO_2$ component of the composite pigment at different filler loadings in the sheet. Various illustrative results are given in Table 7 as follows. For comparative purposes, sheets were similarly made with commercially available $TiO_2$ samples in both the rutile and anatase form and are also shown in Table 7.

TABLE 7

| Example No. | Scattering coefficient ($cm^2 \cdot g^{-1}$) of composite pigment in sheet at loading given below | | | Scattering coefficient ($cm^2 \cdot g^{-1}$) of $TiO_2$ component present at loading given below | | |
|---|---|---|---|---|---|---|
| | 0.5 wt % | 1.0 wt % | 1.5 wt % | 0.5 wt % | 1.0 wt % | 1.5 wt % |
| 10 | 1903 | 1785 | 1679 | 13750 | 11410 | 9297 |
| 12 | 1909 | 1832 | 1883 | 12723 | 11383 | 12270 |
| 15 | 4112 | 4192 | 4051 | 6195 | 6355 | 6075 |
| 18 | 2367 | 2305 | 2225 | 8222 | 7882 | 7435 |

TABLE 7-continued

| Example No. | Scattering coefficient (cm² · g⁻¹) of composite pigment in sheet at loading given below | | | Scattering coefficient (cm² · g⁻¹) of TiO₂ component present at loading given below | | |
|---|---|---|---|---|---|---|
| | 0.5 wt % | 1.0 wt % | 1.5 wt % | 0.5 wt % | 1.0 wt % | 1.5 wt % |
| Rutile TiO₂ (comparative) | | | | 8900 | 8600 | 8500 |
| Anatase TiO₂ (comparative) | | | | 5900 | 5600 | 5500 |

As shown in Table 7 the contribution to scattering coefficient of TiO₂ present can be improved in a paper sheet by incorporating the TiO₂ in a composite pigment material embodying the present invention. In Examples 15 and 18 where the TiO₂ content is relatively high (especially Example 15) the TiO₂ scattering contribution is lower than for Examples 10 and 12. However, the TiO₂ scattering contribution in both Examples 15 and 18 is better than that shown by anatase as pigment on its own and, in any case, even where the scattering falls below that for rutile, Example 15 and to a slight extent Example 18, the combination of retention, formation and burst strength is superior than for rutile TiO₂ as demonstrated earlier in relation to FIGS. 5 to 7.

Example 23

A composite pigment material wherein calcined clay is employed as the fine particulate material may be produced in the manner described in Section 1a by substituting calcined clay for TiO₂. A composite pigment product containing dispersed calcined clay having improved retention in paper sheet production is obtained.

Example 24

A composite pigment material wherein fine silica is employed as the fine particulate material may be produced in the manner described in Section 1a by substituting fine silica for TiO₂. A composite pigment product containing dispersed fine silica having improved retention in paper sheet production is obtained.

Example 25

A composite pigment material wherein fine sodium aluminium silicate is employed as the fine particulate material may be produced in the manner described in Section 1a by substituting fine sodium aluminium silicate for TiO₂. A composite pigment product containing dispersed sodium aluminium silicate having improved retention in paper sheet production is obtained.

What is claimed is:

1. A method of preparing a composite pigment material for use in a composition for making or coating a fibrous sheet material, which method comprises:

treating an aqueous medium containing particles of a fine particulate material and fibers, said treating comprises chemically precipitating, by a precipitation reaction in the aqueous medium, crystals of a white pigment compound thereby producing a composite material, said composite material comprising a composite matrix of fibers and precipitated crystals of the white pigment compound and particles of the fine particulate material dispersed and bonded within the matrix, wherein at least 90% by weight of the fine particulate material in the treated aqueous medium has an equivalent spherical diameter as measured by sedimentation of less than 1 μm and comprises dispersed material which has not previously been used in an industrial operation, and wherein the fine particulate material and the fibers are obtained from separate stocks and are added together prior to the precipitation reaction in relative amounts required to be present in the composite pigment material, the ratio by weight of the fine particulate material to the white pigment compound being from 1:100 to 1:1, wherein said white pigment compound comprises an alkaline earth metal carbonate.

2. The method of claim 1, wherein at least 50% by weight of the fine particulate material has an equivalent spherical diameter as measured by sedimentation of less than 0.5 μm.

3. The method of claim 1, wherein the fine particulate material is selected from TiO₂, calcined kaolin-containing material, silica, sodium silicate, aluminium silicate, sodium aluminium silicate, talc and plastic pigment material.

4. The method of claim 1, wherein the white pigment compound comprises calcium carbonate.

5. The method of claim 1, wherein the fibers employed in the treated aqueous medium comprise fresh fibers from virgin pulp or fibers from broke or recycled paper.

6. The method of claim 5, wherein at least 50 per cent by weight of the fibers are fibers which have not previously been used in papermaking.

7. The method of claim 5, wherein the fibers employed in the treated aqueous medium comprise fibers which have not previously been used in papermaking and which have been beaten to give substantial fibrillation, the fibers having a freeness of 300 CSF or less.

8. The method of claim 7, wherein the fibers comprise fibers which have been subjected to a size classification treatment to separate a fine fraction for use in the treated aqueous medium.

9. The method of claim 7, wherein at least one per cent by weight of the fibers in the treated aqueous medium are fines which, as defined in TAPPI Standard T261 cm-90, will pass through a round hole having a diameter of 76 mm.

10. The method of claim 1, wherein the precipitation reaction is carried out in a batch reactor and the solids contained in the aqueous medium in which the precipitation reaction is carried out, other than solids to be consumed as reagent to form the white pigment compound by the precipitation reaction, constitute from 0.1% to 20% by weight of the suspension.

11. The method of claim 1, wherein the method is carried out as a continuous or semi-continuous process and the solids content of the treated aqueous medium, other than consumable solids, is in the range 20% to 50% by weight.

12. The method of claim 1, wherein the aqueous medium is mechanically agitated before and during the precipitation reaction.

13. The method of claim 1, wherein at least one preliminary precipitation reaction is carried out in the aqueous medium prior to the fine particulate material being present therein.

14. The method of claim 1, wherein the fine particulate material is added to the aqueous medium in multiple additions and a precipitation reaction stage follows each such addition.

15. The method of claim 13, wherein the fine particulate material is added to the aqueous medium in multiple additions and a precipitation reaction stage follows each such addition.

16. The method of claim 1, wherein the white pigment compound further comprises phosphates or silicates of calcium, aluminium or magnesium.

* * * * *